United States Patent Office 3,790,474
Patented Feb. 5, 1974

3,790,474
METHOD OF PURIFYING OILS CONTAINING LIQUID AND SOLID IMPURITIES
James W. Moffitt, 7 Fairwood,
Pleasant Ridge, Mich. 48069
No Drawing. Filed May 10, 1973, Ser. No. 358,941
Int. Cl. C10m 11/00
U.S. Cl. 208—181                  7 Claims

ABSTRACT OF THE DISCLOSURE

A process for removing solid and liquid impurities from used oils such as hydraulic oils, lubricating oils, quench oils, tramp oils, cutting oils and oils used in sharpening, finishing and grinding of metal tools and parts, comprising heating the oil, adding a small amount of an alkaline solution to the oil while stirring the oil, maintaining the treated oil at a heated temperature, subsequently adding an acid to the treated oil mixture while stirring the oil to thoroughly mix the acid with the oil and maintaining the treated oil in a settling container at a heated temperature for a period of at least about 10 hours in order to allow the solids and water to settle to the bottom. The purified oil which remains on top can then be withdrawn. Sodium hydroxide and sulfuric acid are preferred reactants.

BACKGROUND OF THE INVENTION

(1) Field of the invention

The present process relates to a process for treating many types of contaminated oils to remove their impurities so that the oils can be reused. Solids and liquids, e.g. water, are removed from oils such as hydraulic, lubricating, quench, cutting oils or the like by a two-step process in which the oil is treated in one of the steps with a basic alkaline substance and in which the oil is treated in another step with an acidic substance. As a result, the solid and water impurities will precipitate down through the oil so that a layer of purified oil will remain on top ready for reuse.

(2) Description of the prior art

Earlier attemps have been made to purify various oils. Katsuta et al. in U.S. Pat. 3,304,255 disclose that lubricating oils which have been used in internal combustion engines have extremely minute particles of metallic material and may contain materials such as sulfuric acid. Katsuta et al. treat the oil with caustic alkali which presumably neutralizes the acidic substances which are absorbed on the surfaces of the particles so as to facilitate an increase in particle size.

In another process which is only directed to treating lubricating oils, Nelson discloses in U.S. Pat. 1,735,440 a complex treatment procedure involving many steps including heating the oil to 700° F. This high temperature can present a definite fire and explosion hazard. The Nelson process also requires that after an initial clarifying treatment, the oil is to be treated with steam, centrifuged and given a distillation treatment in which the body of oil is gradually heated over an extended period of time while it is agitated with air. As the temperature increases, additional steam is requried and finally the oil is cooled and passed under high pressure through a filter material such as fuller's earth. The apparatus required for the Nelson process is also very complicated.

The present process overcomes the need for complicated purification procedures of the prior art while providing a method by which oils containing solid and liquid impurities can be purified by a single uniform operation.

SUMMARY OF THE INVENTION

According to the present invention, liquid and solid impurity particles can be easily and efficiently removed from a wide range of used oils such as hydraulic, lubricating, quench, cutting, tramp oils, and oils used in sharpening, finishing and grinding of metal tools and parts by first heating the contaminated oil up to a temperature of about 150° F., while adding an alkaline material to the oil which is mixed with the oil. After the mixed alkaline material has thoroughly contacted the oil, an acid is added in the second step of the operation and this is also thoroughly mixed with the oil. The treated oil is maintained at a heated temperature for a period of time of at least about 10 hours and up to as much as about 100 hours, so that the solid and water impurities can drop to the bottom of the container while the purified oil will remain on top. No advantage is found in extending the period of time beyond 100 hours, and generally substantially less time is required.

An object of the present invention is the treatment of many different oils containing contaminate impurities in order to remove these impurities by a simple process involving the addition of an alkaline material and an acid material in order that the liquid and the solid contaminates will settle to the bottom of the treating container.

A further object of the invention is to provide a method for continuously separating and removing contaminates from many types of contaminated oils.

Other objects and advantages of the invention will be apparent to those skilled in the art from the following description.

DESCRIPTION OF THE PREFERRED EMBODIMENTS

The present process is particularly useful to treat oils which have been contaminated by being used in various processes. For example, cutting oils used in a gear cutting operation and in the machining of metal parts may be purified as well as quench oils which are used in the heat treating of metal parts such as tools, gears, etc. Cutting oils comprise a mixture of oils with a surface active agent which is mixed with water to form an emulsion which is used to keep tools cool when metal is being cut. The contaminants of such used cutting oil comprise metal scale, metal chips, salts, dirt and water. Similarly, oil solutions containing dilute sulfuric acid used in steel pickling may be purified. Lubricating oils which are employed to keep machinery and equipment running with a film of oil between mating metal parts can also be treated. The contaminants comprise metal particles, water, dirt, acids, sludge and the like. In addition, swaging oils which are used in swaging operations have been purified, as have oils containing asbestos dust particles which became contaminated when used in brake shoe grinders. The contaminants of used swaging oil comprise mainly contaminants of used quench oils. Hydraulic oil is used to operate machinery by rams and pistons, and is usually under pressure. Its contaminants comprise metal particles, rubber or asbestos seal particles, water, dirt, acid, etc. Floor sweepings, oil absorbents and dirt which are picked up in floor scrubbing operations have also been cleaned from oil. Further examples include the purification of tramp oil effluent from waste treatment plants and from oil collecting basins. Tramp oils are those oils which find their way into aqueous media where they do not belong by various means, such as oil leaks from machinery, automobiles and equipment. Such oils find their way to sewer systems and then to waste treatment plants where they are skimmed off and treated for reuse. Additional impurities which have been removed include aluminum sulfate flock, sulfur and sulfur compounds.

The resulting oils from all of these typical oil using operations which contaminate the oil, as well as oils containing the specific contaminants listed above, can be successfully treated.

The process begins by first heating the contaminated oil to be purified. By heating the oil, the viscosity of the oil is decreased and this will enable the solids to settle out more rapidly since they will be able to travel more easily through the less viscous oil. Any heating temperature which provides a decrease in the viscosity of the oil, but does not cause boiling or damge to the oils, will aid the present process. Temperatures of 130–200° F. can be used, and the preferred temperature for the heating step is from about 140° F. to about 180° F. The process can be carried out at temperatures in excess of 200° F., but the oil should be cooled before the acid is added since a violent boiling action will take place when acid is added to oil which is at a temperature over about 180° F.

After the oil has been initially heated, an alkaline material is added. Among the preferred materials is an aqueous solution of sodium hydroxide, preferably about 50% concentration, known as caustic. Other alkaline compounds can be used such as potassium hydroxide. The amount of the caustic solution added is small and can be from about 0.4% to about 5% by volume of the oil when using 50% caustic. The amount employed will vary with the different oils and with the degree of impurity found therein, but is easily determined empirically. Initially, about 1½% of caustic is added as a trial starting concentration and greater or lesser amounts can then be employed as required.

During the addition of the caustic solution, the oil may be stirred in order that the caustic can be completely mixed with the oil. Any type of stirring may be used such as mechanical stirrers, steam lances, air agitation or even stirring by hand. The stirring should not be excessive or too fast since the heated oil can turn into a gelatinous mass which will retain water and suspended solids. Thus, in small batch operations a Waring blender would not be employed at high speeds.

An excessive amount of stirring is not required. A slow stirring procedure is adequate since it is only necessary to just mix the alkaline material with the oil.

The concentration of the caustic solution, as said above, is preferably the commercially available 50% caustic solution. Other concentrations down to about 25%, however, can be used with great success and the amount employed will, of course, vary substantially proportionately with the concentration of the solution. Thus, for the lowest concentration of about 25%, the amount by volume will be about 0.8 to about 10%.

After the caustic solution has been added to the oil at the heated temperature, the oil is maintained at this temperature for a period of time of approximately 30 minutes. During this period, the oil mixture can be stirred. Very little stirring is necessary, however, since the caustic is heavier than the the oil and it will infiltrate through the oil as it is added to the oil at the top of the oil container. Although the complete mechanism of the present process is not fully understood, it is believed that one of the functions of the alkaline material as it moves through the oil is to absorb and remove water particles mixed in the oil. In the event that the stirring of the oil is continued during this period, high speed mixing should be especially avoided since this would tend to blend the oil, water and solids together in a gelled mass. Accordingly, any mixing should be done very slowly.

A further technique for mixing the caustic with the heated oil is to simultaneously add the oil and solution to an oil tank. The turbulence produced by the blending of these two liquids will cause them to be thoroughly mixed.

When the caustic is added to the oil, there is very little visual change noted, although sometimes the oil will take on a grey color. Even though some stirring is preferred when the caustic is added to the contaminated oil, the process will work adequately when there is no stirring and the mixture is just allowed to sit while being maintained at the elevated temperature.

After the oil has been treated with the caustic, it is then treated with acid. The preferred acid is sulfuric acid, which can be used in a commercially available concentration of 93%. At this concentration, about 0.1% to 5% by volume of acid is usually sufficient to treat the contaminated oils described above. Other concentration of sulfuric acid down to about 10% could be used, but when more dilute solutions are employed, it will, of course, be necessary to increase volume and at the lowest concentration to increase the amount of the acid solution added up to as high as 20% by volume. The higher 93% concentration is preferred.

The acid should be added slowly to the previously treated oil mixture. If the acid is added too rapidly, there will be an uncontrolled, turbulent, boiling reaction which takes place between the residual caustic present and the acid. Also during this period, the oil should not be at a temperature in excess of about 180° F., since the acid being added will react with the hot oil to also produce a boiling action. As in the first step, if the oil is stirred or agitated, it should be done slowly or gently, when the acid is added. A further caution to be noted is that the addition of the caustic and acid should be done with adequate ventilation, since the chemical fumes emitted by the process are very toxic.

Sulfuric acid is the preferred acid in the present process in view of its low cost and its commercial availability. Other mineral acids may be employed including hydrochloric acid, phosphoric acid, nitric acid and pickle acid, which contains about 10% sulfuric acid.

After the acid has been added to the oil mixture, a minimum amount of stirring is employed in order to thoroughly mix the acid with the oil and caustic solution. Here again, it is important that any mixing is to be by slow stirring or agitation. While there is no precise time limit on this final stirring, it is generally unnecessary to stir for more than 10 to 30 minutes. Too long a period of stirring prevents particles from settling to the bottom.

With regard to the mechanism of the present process, if a sample is taken and viewed after the acid has been stirred into the oil mixture, it is seen that the oil starts coming to the top of the surface and water and solids start settling to the bottom of the sample container almost immediately.

After the mixing has been accomplished, the completely treated oil is allowed to rest in a container for a period from about 10 hours to 96 hours in order that the oil can rise to the surface and the solids and water can drop to the bottom. During the settling period the oil may be maintained at elevated temperatures of up to 190° F. in order to speed up the settling process, since these higher temperatures will decrease the viscosity of the oil, but the oil should not be boiled.

When a 30,000 gallon tank of oil containing solids and water is treated by the present process, the oil can be completely separated in from about 48 to 100 hours. Tests have also been conducted with this amount of oil in which the contaminates settled in less than 12 hours. Generally, the longer settling time is preferred in order for the particles to completely settle out. Accordingly, after the particles have settled, there will be no need for holding the oil at this higher temperature for any additional time since all of the particles will have settled.

A periodic check can be made of the oil-rise-rate with a sampler tube or with other analytical equipment so that when the rate of oil rising stops, the oil can be promptly removed and reused.

As described above, the oil is preferably heated in the final settling step to a temperature greater than 150° F. in order to lower the viscosity of the oil so that the particles can easily settle through the oil. If the temperature is maintained at a temperature lower than 150° F., all of the solid particles may not completely precipitate. For best results, then, the temperature of the oil should be maintained at a temperature of between about 150° F. and 180° F. for the entire settling period.

Although it is preferred to conduct the present process by first treating the contaminated oil with an alkaline material and then with an acid material, the present process could be conducted in the reverse order with the acid being added first to the oil and then with the addtion of the caustic.

In the reverse procedure, the individual steps are substantially the same with regard to amounts of reactants and conditions of heating and stirring. It is preferred that the oil be heated to about 150° F., mixed thoroughly with 93% sulfuric acid, then mixed with 50% caustic and finally be permitted to stand for at least 10 hours. Generally, the reverse procedure is less desirable, but it can be used.

As indicated above, the physical and chemical phenomena by which the process achieves its purpose is not completely known. However, from observations made, it appears that the first treatment of the contaminated oil with caustic causes a reaction in which sludge and water start to separate from the oil. Then in the second step, the added acid causes these particles to be dispersed and causes the purified oil particles to rise to the surface while the contaminants drop to the bottom.

The following example is presented to further illustrate the present invention.

The oil to be treated is placed in a container and is heated to 150° F. While stirring by mechanical means or agitating by air means, 15 milliliters of a liquid 50% solution of sodium hydroxide is added for each gallon of oil. The mixture is maintained at the heated temperature and, while still stirring the oil, a 93% solution of sulfuric acid is slowly added in an amount of about 3 milliliters per gallon of oil. After the acid is added, the mixture is continued to be stirred until thoroughly mixed. The treated oil is then allowed to stand for 10 to 96 hours, while the temperature is maintained at 150° F. and controlled so that the oil does not boil. During this time, solids and water will drop to the bottom of the container. The accumulated purified oil at the top of the container is then drawn off.

As a note of caution, it should be pointed out that the various equipment used in feeding acid and caustic to the oil should not be interchanged without thorough cleaning of that equipment, since violent reaction will occur when the strong acid and alkali are mixed.

Others may practice the invention in any of a number of numerous ways which will be suggested to one skilled in the art by the present disclosure. All such practice of the invention is considered to be a part hereof, provided it falls within the scope of the following claims.

What is claimed is:

1. A process for purifying used oils of solid and liquid contaminants comprising
    heating the oil to be cleaned to a temperature of about 130° F. to 200° F.;
    adding an alkaline solution having a concentration of at least about 25% to the heated oil in an amount equivalent to about 0.4% to about 5% by volume of the oil of a 50% concentration solution while stirring the oil;
    maintaining the oil at a heated temperature to allow the alkaline material to contact the oil;
    adding an acid solution having a concentration of at least 10% slowly to the oil mixture in an amount equivalent to about 0.1% to about 5% by volume of the oil of a 93% concentration solution while maintaining the oil in an agitated condition;
    continuing to agitate the acid-treated oil until thoroughly mixed;
    maintaining the treated oil in a settling container at a temperature of about 150° F. to 190° F., but less than the boiling point of the oil for a period of at least about 10 hours in order that the solids and water may settle to the bottom of the settling container; and
    drawing off the purified oil accumulated on the top of the settling container which contains essentially no contaminant solids or liquids trapped therein.

2. A process according to claim 1, wherein said alkaline solution is sodium hydroxide.

3. A process according to claim 1, wherein said acid is selected from the group consisting of sulfuric acid, hydrochloric acid, phosphoric acid, nitric acid and pickle acid.

4. A process according to claim 3, wherein said acid is sulfuric acid.

5. A process according to claim 1, wherein the oil comprises lubricating oil, hydraulic oils, quench oils, tramp oil, cutting oils or oils used in sharpening, grinding and finishing of metal tools and parts.

6. A process according to claim 1, wherein the contaminants comprise metal scale, metal particles, dirt, water, metal salts, acid or sludge.

7. A process for purifying used oils according to claim 1, comprising
    heating the oil to be cleaned to a temperature of about 130° F. to 180° F.;
    adding an acid solution having a concentration of at least 10% slowly to the oil mixture in an amount equivalent to about 0.1% to about 5% by volume of the oil of a 93% concentration solution while maintaining the oil in an agitated condition;
    adding an alkaline solution having a concentration of at least about 25% to the heated oil in an amount equivalent to about 0.4% to about 5% by volume of the oil of a 50% concentration solution while stirring the oil;
    maintaining the oil at a heated temperature to allow the alkaline material to contact the oil;
    maintaining the treated oil in a settling container at a temperature of about 150° F. to 190° F., but less than the boiling point of the oil for a period of at least about 10 hours in order that the solids and water may settle to the bottom of the settling container; and
    drawing off the purified oil accumulated on the top of the settling container which contains essentially no contaminant solids or liquids trapped therein.

References Cited
UNITED STATES PATENTS

| | | | |
|---|---|---|---|
| 1,707,671 | 4/1929 | Agcock et al. | 208—183 |
| 1,735,440 | 11/1929 | Nelson | 208—181 |
| 1,281,354 | 10/1918 | Handy | 208—183 |
| 1,655,660 | 1/1928 | Odom | 208—183 |
| 3,304,255 | 2/1967 | Katsuta et al. | 208—179 |

DELBERT E. GANTZ, Primary Examiner

J. M. NELSON, Assistant Examiner

U.S. Cl. X.R.

208—179, 183